(12) United States Patent
Kuykendall et al.

(10) Patent No.: US 6,965,677 B2
(45) Date of Patent: Nov. 15, 2005

(54) FOCUS FADER WITH ADJUSTABLE TENSION

(75) Inventors: John L. Kuykendall, Lake Worth, FL (US); Edward R. Dubinsky, Sarasota, FL (US)

(73) Assignee: Stanton Magnetics Inc., Boynton Beach, FL (US)

( * ) Notice: Subject to any disclaimer, the term of this patent is extended or adjusted under 35 U.S.C. 154(b) by 292 days.

(21) Appl. No.: 09/929,544

(22) Filed: Aug. 14, 2001

(65) Prior Publication Data

US 2002/0031237 A1    Mar. 14, 2002

Related U.S. Application Data

(63) Continuation-in-part of application No. 09/634,410, filed on Aug. 9, 2000.

(51) Int. Cl.[7] ............................................. H04B 1/00
(52) U.S. Cl. .................................... 381/119; 369/4
(58) Field of Search ........................ 338/183, 118, 180, 338/160, 196, 176; 381/119, 104, 109; 369/4; 84/660, 697

(56) References Cited

U.S. PATENT DOCUMENTS

| | | | |
|---|---|---|---|
| 3,939,451 A | * | 2/1976 | Kasahima .................... 338/128 |
| 4,429,219 A | * | 1/1984 | Yochum et al. ............. 250/229 |
| 5,259,232 A | * | 11/1993 | Schweitzer ................ 72/390.5 |
| 5,986,584 A | * | 11/1999 | Breitbarth .................... 341/13 |

* cited by examiner

*Primary Examiner*—Vivian Chin
*Assistant Examiner*—Justin Michalski
(74) *Attorney, Agent, or Firm*—Pitney Hardin LLP

(57) ABSTRACT

The apparatus is a cross fader with a slide assembly which slidingly traverses a path defined by two parallel guide rods which pass through a partially open channels in the slider of the slide assembly. Tension plates are secured by self-tapping screws within recesses laterally adjacent to open portions of at least one of the channels. The tension plates are urged radially against the guide plates, so that the tighter the screws are secured, the tighter the tension plates are urged against the guide rods and the more frictional resistance is generated when the user moves the slider.

5 Claims, 4 Drawing Sheets

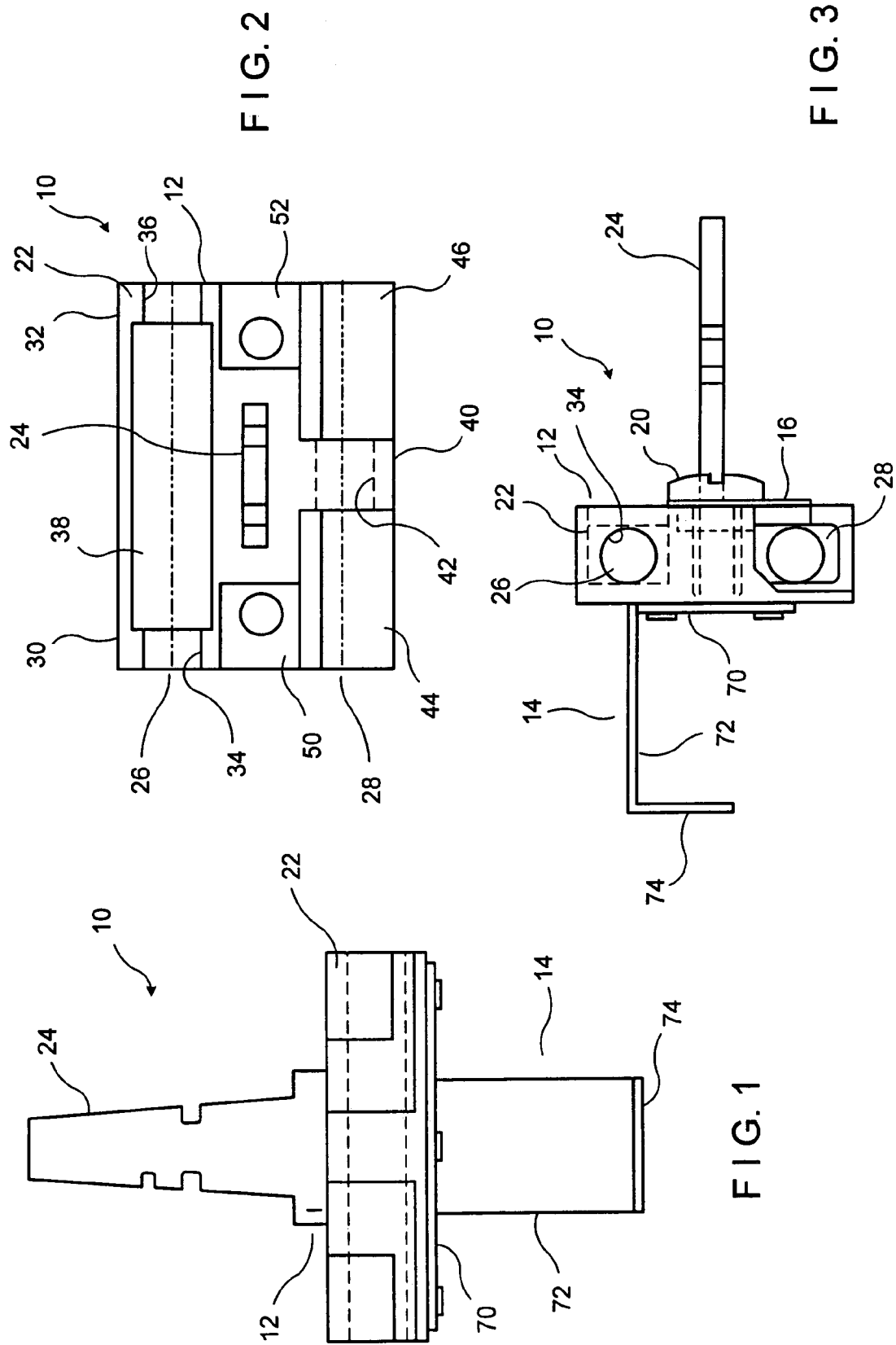

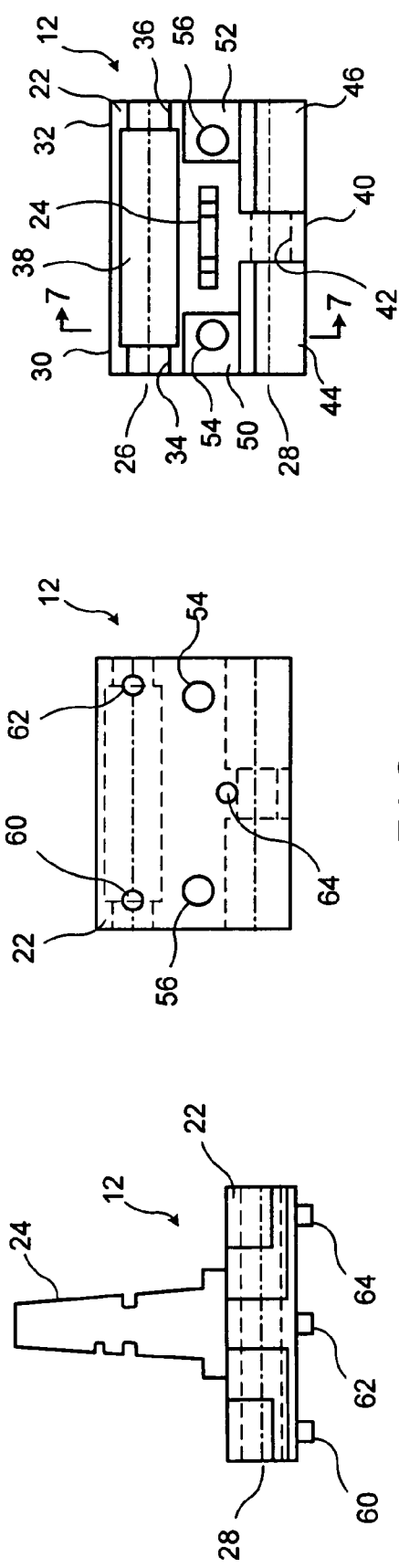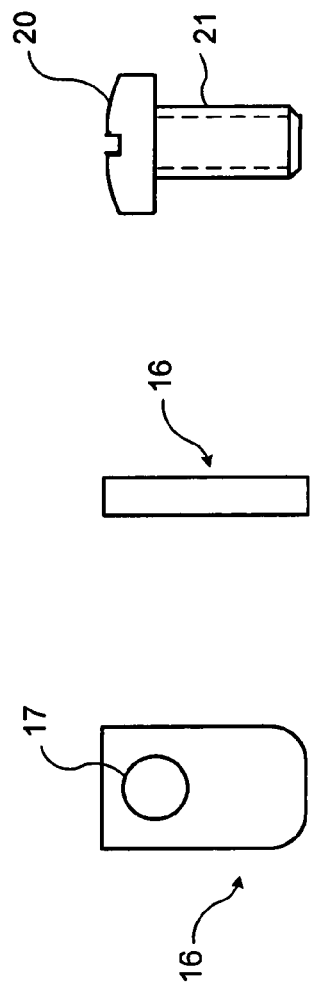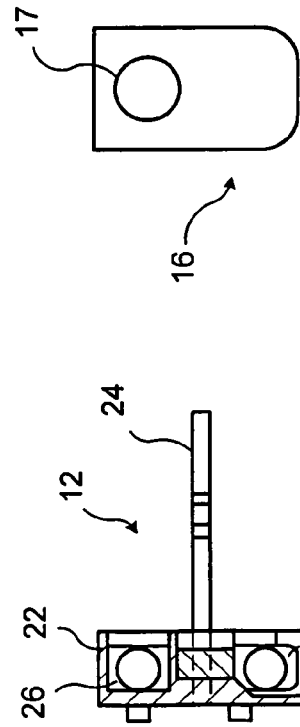

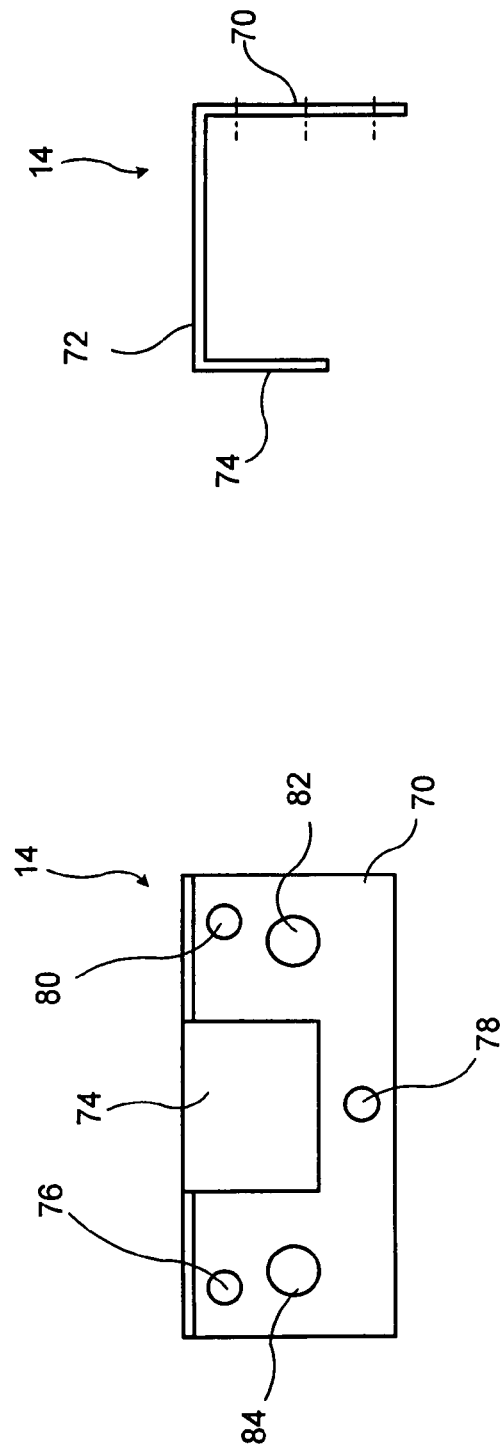
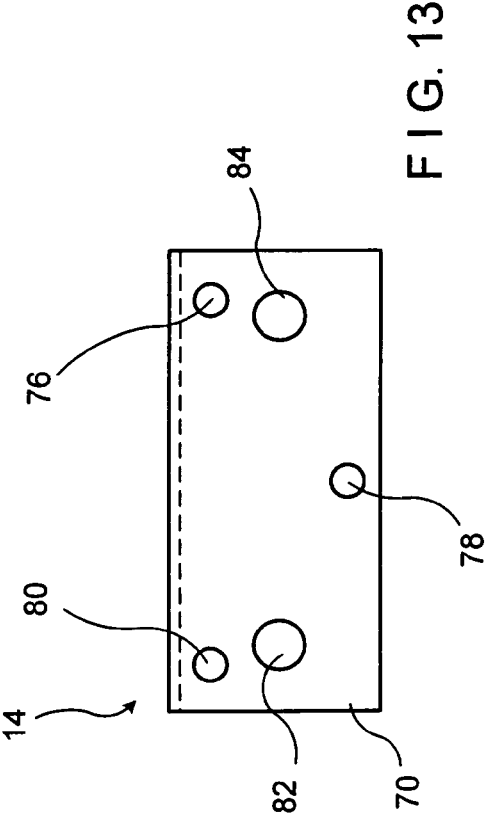
FIG. 11
FIG. 12
FIG. 13

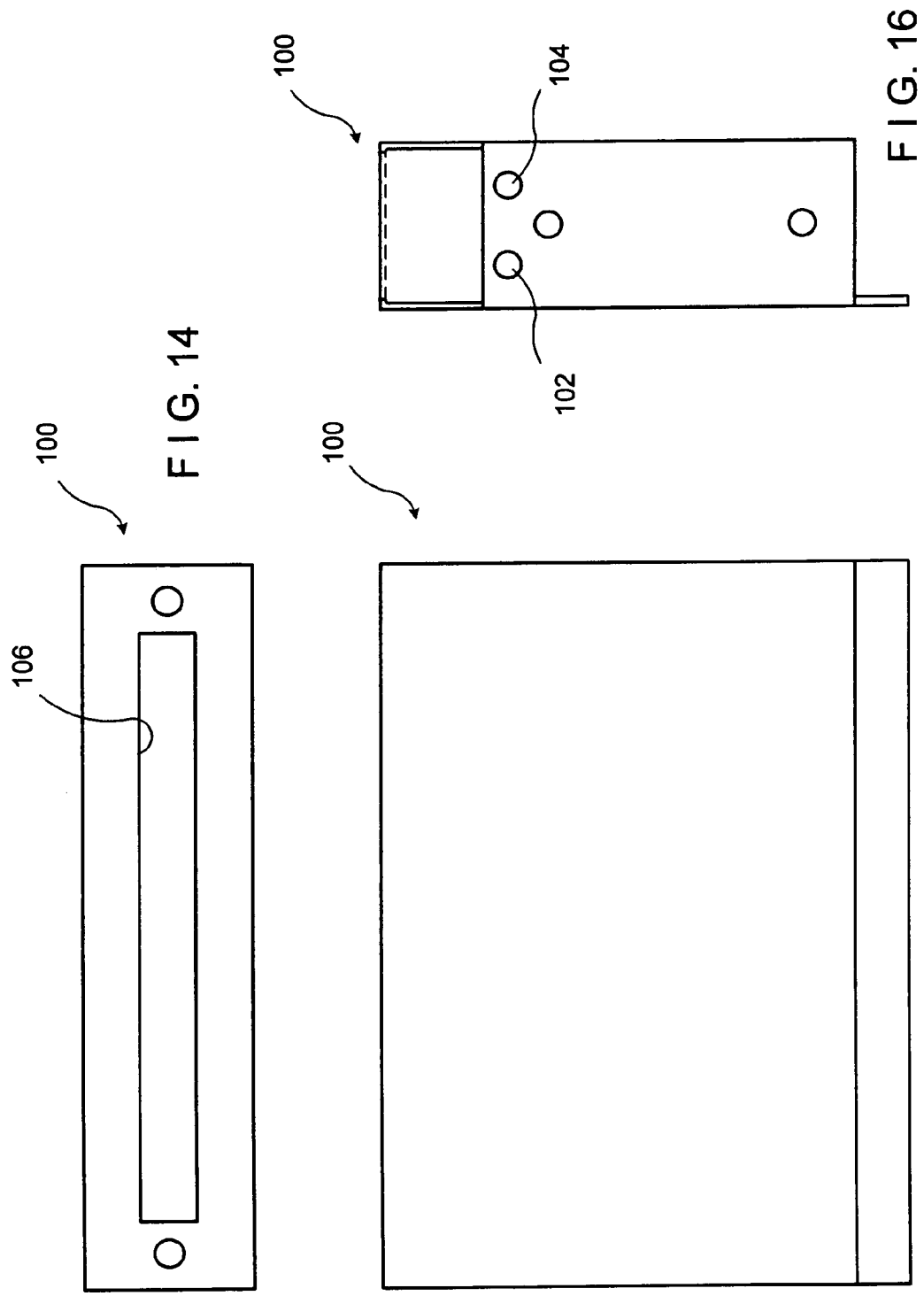

FOCUS FADER WITH ADJUSTABLE TENSION

This application is a continuation-in-part application of application Ser. No. 09/634,410 entitled "Focus Fader with Dual Optocouplers" filed on Aug. 9, 2000, the contents of which are hereby incorporated by reference.

BACKGROUND OF THE INVENTION

1. Field of the Invention

This invention pertains to a cross fader with dual optocouplers and a handle with adjustable tension, which can be used in a DJ (disk jockey) mixer or as a replacement cross fader for a DJ mixer.

2. Description of the Prior Art

In the prior art, cross faders have used resistive components to allow a user, such as a disk jockey, to cut or short out a first signal from a respective channel of audio signal, while allowing the opposite channel of signal to pass. However, such resistive cross faders have been deficient with respect to noise, wear characteristics and lack of complete cutting of the respective signal.

The parent application of the instant application relates to the use of dual optocouplers to address this deficiency of the prior art. This has been found very satisfactory. However, it is desired to improve this apparatus by providing adjustable tension in the handle.

OBJECTS AND SUMMARY OF INVENTION

It is therefore an object of the present invention to achieve all of the objects of the parent application with respect to a cross fader, and to further provide a cross fader in which the tension of the handle can be adjusted.

These and other objects are attained by providing a cross fader which uses dual optocouplers—one for each respective channel of the audio signal and located at each end of the fader travel. A blade shutter is positioned by guide rods so that it passes between the operational slots of the optocouplers. The blade shutter is mechanically coupled to a knob on the outside of the cross fader so that the operator can move the blade shutter into the operational slot of an optocoupler, thereby cutting the channel of the audio signal from that optocoupler while allowing the other channel of the audio signal from the other optocoupler to pass unimpeded.

The optocouplers are mounted on a p.c. board for ease of assembly. Likewise, the entire mechanism is mounted to a mounting plate for ease in replacement and securing to the frame of the disk jockey mixer.

Furthermore, the slider of the present invention, which is positioned by guide rods, includes tension plates which impinge against at least one of the guide rods. The tension plates are secured to the slider assembly by screws, so that the tension of the screws can be adjusted thereby varying the tension of the tension plates against the guide rod(s) thereby varying the tension of the slider assembly. This variation of the tension provides for variation in ease of manually moving the slider.

DESCRIPTION OF THE DRAWINGS

Further objects and advantages of the invention will become apparent from the following description and claims, and from the accompanying drawings, wherein:

FIG. 1 is a side plan view, partially in phantom, of the slide assembly of the cross fader of the present invention.

FIG. 2 is a top plan view, partially in phantom, of the slide assembly of the cross fader of the present invention.

FIG. 3 is an end plan view, partially in phantom, of the slide assembly of the cross fader of the present invention.

FIG. 4 is a side plan view partially in phantom, of the slide of the slide assembly of the cross fader of the present invention.

FIG. 5 is a bottom plan view of the slide of the slide assembly of the cross fader of the present invention.

FIG. 6 is a top plan view, partially in phantom, of the slide of the slide assembly of the cross fader of the present invention.

FIG. 7 is a cross-sectional view along plane 7—7 of FIG. 6.

FIG. 8 is a top plan view of the tension plate of the slide assembly of the cross fader of the present invention.

FIG. 9 is a side plan view of the tension plate of the slide assembly of the cross fader of the present invention.

FIG. 10 is a side plan view of a typically screw used to fasten the tension plate to the slide of the slide assembly of the cross fader of the present invention.

FIG. 11 is a bottom plan view of the shutter of the cross fader of the present invention.

FIG. 12 is a side plan view of the shutter of the cross fader of the present invention.

FIG. 13 is a top plan view of the shutter of the cross fader of the present invention.

FIG. 14 is a top plan view of the fader slide body of the cross fader of the present invention.

FIG. 15 is a side plan view of the fader slide body of the cross fader of the present invention.

FIG. 16 is an end plan view of the fader slide body of the present invention.

DETAILED DESCRIPTION OF THE PREFERRED EMBODIMENT

At the outset, the parent application, application Ser. No. 09/634,410 entitled "Focus Fader with Dual Optocouplers" filed on Aug. 9, 2000, is hereby incorporated by reference.

Referring now to the drawings in detail wherein like numerals refer to like elements throughout the several views, one sees that FIG. 1 is a side view of slide assembly 10 of the present invention for a cross fader. Slide assembly 10 includes slider 12 (see FIGS. 4–7) and shutter 14 (see FIGS. 11–13). Slider 12 is typically made of plastic. Shutter 14 is typically made of metal. Additionally, as shown in FIG. 3, slide assembly 10 includes tension plates 16 (see also FIGS. 8 and 9) which are secured to slider 12 by self-tapping screws 20 (see also FIG. 10). Tension plates 16 are typically formed of plastic.

Slider 12 includes main body 22 with upwardly pointing fin-like handle 24 integrally formed therein. Main body 22 includes two longitudinally oriented partially open passageways 26, 28. Guide rods 102, 104, in a fixed position with respect to cross fader slide body 100 as shown in FIG. 16, pass through passageways 26, 28 and provide a path of travel for slide assembly 12 wherein fin-like handle 24 protrudes through slot 106 (see FIG. 14) of cross fader slide body 100.

As shown in FIG. 2, partially open passageway 26 is bounded by walls 30, 32 with round apertures 34, 36, respectively, passing therethrough. Open channel 38 is formed between walls 30, 32. Guide rod 102 passes through apertures 34, 36 which slidingly positions slider assembly 10. Guide rods 102 further passes through open channel 38.

Partially open passageway 28 includes central wall 40 with round aperture 42 therethrough and open channel segments 44, 46 on the sides of central wall 40. Guide rod 104 passes through aperture 42 which further slidingly positions slider assembly 10. Recesses 50, 52 are formed laterally adjacent to open channel segments 44, 46, with threaded apertures 54, 56 formed therein. This allows tension plates 16 to be placed in recesses 50, 52 so that tension plate apertures 17 align with threaded apertures 54, 56. Self-tapping screws 20 pass through tension plate apertures 17 and threaded apertures 54, 56. This causes tension plates 16 to be radially urged against guide rod 42. Progressively tightening self-tapping screws 20 causes tension plates 16 to be urged progressively tighter against guide rod 104 thereby increasing the friction between tension plates 16 and guide rod 104 and increasing the tension which the user encounters when moving slider assembly 10 by handle 24.

The underside of main body 22 includes three positioning bosses 60, 62, 64.

Shutter 14 includes three metal portions at successive right angles—upper attachment portion 70, middle shutter portion 72 which interacts with the optocouplers (as described in the parent application) and lower portion 74. Portions 70 and 74 are parallel to each other, and are perpendicular with middle shutter portion 72. Upper attachment portion 70 includes three positioning apertures 76, 78, 80 through which positioning bosses 60, 62, 64 of the underside of main body 22 of slider 12 pass. A heat seal is then applied to the exposed portion of positioning bosses 60, 62, 64 to fasten shutter 14 to slider 12. Shutter 14 then, of course, moves in concert with slider 12. Additionally, if the shank 21 of self-tapping screw 20 is longer than the depth of slider 12, then apertures 82, 84 are formed in upper attachment portion 70 of shutter 14 to align with threaded apertures 54, 56 to allow any portion of shank 21 protruding from the underside of slider 12 to pass therethrough.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A sliding control apparatus including:

a cross fader apparatus;

at least one guide rod;

a slider assembly including at least one partially open passageway for slidably traveling on said at least one guide rod wherein a position of said slider assembly along said at least one guide rod controls said cross fader apparatus;

a tension plate mounted adjacent to said at least one partially open passageway so as to bear upon said at least one guide rod, said tension plate being mounted so as to impinge against said at least one guide rod with a variable amount of force thereby varying frictional resistance between said slider assembly and said at least one guide rod; and wherein said tension plate includes a first aperture and is mounted in a recess in said slider assembly, said recess including a second aperture, said second aperture being aligned with said first aperture and a screw passing therethrough, wherein the variable amount of force is varying by varying an extent of insertion of said screw into said second aperture.

2. The sliding control apparatus of claim 1 further including a handle extending from said slider assembly.

3. The sliding control apparatus of claim 2 further including a shutter extending from a lower portion of said slider assembly wherein a position of said shutter is controlled by a position of said slider assembly with respect to said guide rail.

4. The sliding control apparatus of claim 3 wherein said at least one guide rod includes a first guide rod and a second guide rod, and wherein said tension plate bears against said first guide rod.

5. The sliding control apparatus of claim 4 wherein said first and second guide rods are supported by a structure, said structure further including a slot through which said handle extends.

* * * * *